United States Patent Office 3,775,470
Patented Nov. 27, 1973

3,775,470
PROCESS FOR THE PREPARATION OF ORGANO-
PHOSPHONYL DICHLORIDES
Calvin Vogel, Easton, Pa., assignor to GAF
Corporation, New York, N.Y.
No Drawing. Filed July 7, 1971, Ser. No. 160,540
Int. Cl. C07f 9/42
U.S. Cl. 260—502.4 R                14 Claims

ABSTRACT OF THE DISCLOSURE

Process for the preparation of organophosphonyl dichlorides is provided comprising reacting an organophosphonyl ester having the structural formula:

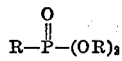

wherein each R can independently be an alkyl or aryl radical, and $PCl_5$ in the presence of a catalyst comprising LiX wherein X is a halogen radical, and recovering the corresponding organophosphonyl dichloride.

PROCESS FOR THE PREPARATION OF ORGANO-
PHOSPHONYL DICHLORIDES

This invention relates to an improved process for the preparation of organophosphonyl dichlorides. More particularly, this invention relates to a catalytic process for the preparation of organophosphonyl dichlorides which can be conducted at normal pressures.

2-haloethyl phosphonic acids are known as valuable plant growth stimulants. These compounds, particularly 2-chloroethyl phosphonic acid, have been used extensively as plant growth hormones for increasing crop yields of, for example, pineapples, soy beans and the like. The use of these compounds are described, for example, in Nature, vol. 218, page 974 (1968), by Cooke and Randall.

Known procedures for preparing these compounds have not been satisfactory from the standpoint of economy and product purity. One known procedure involves hydrolysis of a diester of a 2-haloethyl phosphonic acid to the desired 2-haloethyl phosphonic acid with aqueous HCl under atmospheric pressure. The yields and product purity from this process are too low for it to be considered commercially useful.

Phosphonyl dichlorides can be readily converted to the corresponding acids via hydrolysis by simple treatment with water. The methods heretofore employed for the preparation of phosphonyl dichlorides have generally involved the reaction of a phosphonate ester and PCl. These reactions, however, have heretofore been conducted at temperatures above 150° C. and at superatmospheric pressure conditions. The use of pressurized reactors has heretofore been required because $PCl_5$ sublimes at 162° C. Additionally, when this reaction was run at lower temperatures, for example about 100° C., the major product was found to be mono-halo-monoesters of phosphonic acids.

Accordingly, it is an object of the present invention to provide organophosphonyl dichlorides in high yields without resorting to superatmospheric pressure conditions.

It is another object of the present invention to provide organophosphonyl dichlorides with a high degree of purity thereby enabling their convenient hydrolysis to the corresponding acid without the formation of relatively toxic impurities. This is particularly important because of the potential ultimate use of the final product as a plant growth hormone for increasing crop yields of such products as pineapples, soy beans and the like.

It is still another object to provide a process for preparing organophosphonyl dichlorides wherein relatively impure reactants can be employed and yet the product can be obtained in high purity.

It is a still further object of the present invention to provide a catalytic process for the preparation of organophosphonyl dichlorides wherein the reaction can be run under simple reflux conditions.

These as well as other objects are accomplished by the present invention which provides a process for the preparation of organophosphonyl dichlorides comprising reacting an organophosphonyl ester having the structural formula:

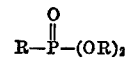

wherein each R can independently be an alkyl or aryl radical, and $PCl_5$ in the presence of a catalyst comprising LiX wherein X is a halogen radical and thereafter recovering the corresponding organophosphonyl dichloride.

As employed herein, the term "alkyl" is intended to encompass both acyclic and cyclic alkyls as well as substituted alkyls such as for example haloalkyls, acyloxyalkyls, arylalkyls, aryloxyalkyls and the like. Generally these alkyl groups contain from 1 to about 10 carbon atoms. As employed herein, the term "aryl" is intended to encompass aromatic hydrocarbons containing from 6 to 12 carbon atoms.

Typical organophosphonyl esters which can be employed in the present invention are, for example, alkylphosphonyl esters such as dimethyl β-chloroethylphosphonate, diethyl β-chloroethylphosphonate, di-β-chloroethyl β-chloroethylphosphonate, dibenzyl β-chloroethylphosphonate, dimethyl β-acetoxyethylphosphonate, di-ethyl β-acetoxyethylphosphonate, dimethyl methylphosphonate, dicyclohexyl methylphosphonate, dimethyl benzyl phosphonate, diethyl benzylphosphonate and the like; and arylphosphonyl esters such as dimethyl phenylphosphonate, diethyl phenylphosphonate and the like. Preferably, alkyl or aryl β-chloroethyl phosphonates are employed.

The organophosphonyl esters and the phosphorus pentachloride ($PCl_5$) can be reacted in the stoichiometrically required proportions. Generally, however, an excess of the $PCl_5$ is added to insure completeness of reaction. Preferably the $PCl_5$ is added slowly or in periodic small amounts over a period of time generally ranging from about 15 minutes to about 1 hour. During this addition period, it is considered preferable to maintain reaction temperature below about 100° C.

The catalyst employed in the present invention comprises a lithium halide such as, for example, lithium chloride or lithium bromide. If desired, the lithium halide can be employed in admixture with other metal halides especially the alkali metal and alkaline earth metal halides such as sodium chloride, magnesium chloride, potassium chloride and the like. When admixtures are employed, the lithium halide preferably comprises a major portion of the mixture that is at least about 50% by weight and most preferably, at least about 75% by weight. Catalytically effective amounts of the lithium halide have been found to range from about 5 to about 25 grams per mole of phosphonate employed. Although the order of addition is not considered critical, it is generally considered preferable to admix the phosphonate ester and catalyst prior to addition of the $PCl_5$.

Once the addition of the $PCl_5$ has been completed, the reaction mixture can be brought to reflux and the reaction can be continued for a period of time ranging from about 0.5 hour to about 6 hours. Longer or shorter reaction periods can be employed depending upon the particular conditions. Thereafter, the alkyl or aryl chloride and phosphorus oxychloride byproducts can be removed by distillation at atmospheric pressure. Once the by-products are removed, the organophosphonyl dichloride can be recovered preferably, by distillation at reduced pressure. Since the organophosphonyl dichloride is generally removed by distillation, it can be obtained in a high degree of purity regardless of the purity of the starting materials. Employing the process of the present invention, it has been found that organophosphonyl dichlorides are obtained in high yield and high purity.

It has also been found that the residue remaining in the reaction zone after recovery of the organophosphonyl dichloride is surprisingly catalytically more active than the initial catalyst. Thus, after startup, the reaction can be repeatedly conducted on either a batch or continuous basis without the addition of fresh catalyst until the catalytic residue is exhausted. Because of the relatively high boiling point of the catalytic residue, it has been found that the residue can be repeatedly employed for long periods of time without either becoming poisoned or exhausted.

The organophosphonyl dichlorides obtained through the present invention are easily converted to the corresponding acids by treatment with water. Thus, for example β-chloroethylphosphonyl dichloride upon treatment with water forms β-chloroethylphosphonic acid in high yields and of high purity. The ability to obtain such 2-haloethylphosphonic acids in high purity is an especially desirable aspect of the present invention since the absence of impurities is particularly important because of the potential use of the hydrolyzed product as a plant growth hormone for increasing crop yields. Additionally, the organophosphonyl dichlorides obtained through the process of the present invention can be readily converted to compounds which are effective as flame retardants or are useful in agricultural chemicals.

The following examples further define, describe and compare methods of preparing organophosphonyl dichlorides in accordance with the present invention. Parts and percentages are by weight unless otherwise indicated.

EXAMPLE 1

A 250-milliliter round-bottom flask fitted with a stirrer, thermometer and Vigreaux column capable of variable take-off was charged with 53.8 grams of bis-(2-chloroethyl)-2-chloroethyl phosphonate and 9 grams of lithium chloride. The flask was kept below 80° C. and 87.4 grams of PCl$_5$ was added proportionwise with continuous stirring over the course of one-half hour. The reaction mixture was then heated to reflux (104°–110° C.) for two hours. Phosphorus oxychloride and ethylene dichloride, produced during the reaction, were distilled off at atmospheric pressure to give a homogeneous solution of the two halides weighing 60.6 grams. The residue in the flask was distilled at reduced pressure yielding 22.7 grams (67%) of β-chloroethyl phosphonyl dichloride, boiling point 55°–59° C. at 0.3 mm. Hg.

EXAMPLE 2

The procedure described in Example 1 was repeated except that 4.5 grams of lithium chloride was employed. There was obtained 22.4 grams (66%) of β-chloroethyl phosphonyl dichloride.

EXAMPLE 3

(A) The procedure described in Example 1 was repeated except that the reflux time was increased to four hours. There was obtained 23.2 grams (68%) of β-chloroethylphosphonyl dichloride.

(B) The identical procedure was repeated with 53.8 grams of bis-(2 - chloroethyl)-2-chloroethylphosphonate and 87.4 grams of PCl$_5$ being charged to the flask; however, in this instance, no lithium chloride was added. There was obtained 10.2 grams (30%) of β-chloroethylphosphonyl dichloride and 26.7 grams (62%) of the monochloroethylester of 2-chloroethylphosphonyl chloride.

EXAMPLE 4

The procedure described in Example 1 was repeated except that 1.0 grams of lithium chloride was employed. There was obtained 20.5 grams (61%) of β-chloroethylphosphonyl dichloride.

EXAMPLE 5

The procedure described in Example 1 was repeated except that 9 grams of lithium bromide was employed. There was obtained 26 grams (74%) of β-chloroethylphosphonyl dichloride.

EXAMPLE 6

The procedure described in Example 2 was repeated and a 66% yield of β-chloroethylphosphonyl dichloride was again obtained. Thereafter the residue remaining after the distillation of the β-chloroethylphosphonyl dichloride was employed as a catalyst and 53.8 grams of fresh bis-(2 - chloroethyl) - 2 - chloroethyl phosphonate and 87.4 grams of PCl$_5$ were charged to the reaction flask. The yield of β-chloroethylphosphonyl dichloride obtained in this instance was 34–35 grams (94–97%).

EXAMPLE 7

(A) A 250-milliliter flask was charged with 40.1 grams of diethyl β-chloroethylphosphonate and 1.0 gram of lithium chloride. 87.4 grams of PCl$_5$ were added over a 15-minute period while maintaining the temperature below 25° C. The reaction mixture was then refluxed for 2 hours and the POCl$_3$ produced was distilled off. There was isolated, after distilling the residue, 24.1 grams (67%) of β-chloroethylphosphonyl dichloride.

(B) For comparative purposes, the identical example was repeated except that no lithium chloride was employed. After the reaction, there was isolated, upon distilling the residue, 17.3 grams (48%) of β-chloroethylphosphonyl dichloride.

EXAMPLE 8

(A) A 100-milliliter flask was charged with 22.4 grams of diethyl acetoxyethylphosphonate

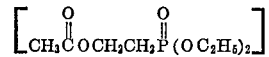

and 4.5 grams of lithium chloride. 69 grams of PCl$_5$ were added portionwise. Distillation of the reaction mixture gave 4.2 grams of a liquid containing 38% β-chloroethylphosphonyl dichloride.

(B) For comparative purposes, the identical reaction was repeated except that in this instance no lithium chloride was employed. Distillation gave 1.6 grams of a liquid that contained 6% of β-chloroethylphosphonyl dichloride.

EXAMPLE 9

Nine grams (0.05 mole) of β-chloroethylphosphonyl dichloride obtained in Example 2 was added to 20 g. water and 20 g. ice. The mixture was stirred until it reached room temperature. A one-phase aqueous system was obtained. The water was removed from the product by flash evaporation on a rotating evaporator leaving 7.2 g. (100%) 2-chloroethylphosphonic acid. This material assayed 98.5% by titration.

Although specific materials and conditions were set forth in the above exemplary processes for preparing the organophosphonyl dichlorides in accordance with the present invention, these are merely intended as illustrations of the present invention. Various other reactants and conditions such as those listed above may be substituted in the examples with similar results.

Other modifications of the present invention will occur to those skilled in the art upon a reading of the present disclosure. These are intended to be included within the scope of this invention.

What is claimed is:

1. Process for the preparation of organophosphonyl dichlorides comprising reacting an organophosphonyl ester having the structural formula:

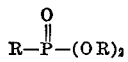

wherein each R can independently be an alkyl or aryl radical, and $PCl_5$ in the presence of a catalyst consisting essentially of a member selected from the group consisting of LiX and mixtures consisting of LiX as major component and an alkalimetal halide or alkaline earth metal halide wherein X is chlorine or bromine and recovering the corresponding oragnophosphonyl dichloride.

2. Process as defined in claim 1 wherein the alkyl radical contains from 1 to about 10 carbon atoms.

3. Process as defined in claim 1 wherein the aryl radical contains from 6 to 12 carbon atoms.

4. Process as defined in claim 1 wherein an alkyl or aryl β-chloroethyl phosphonate is employed.

5. Process as defined in claim 4 wherein di-β-chloroethyl β-chloroethyl phosphonate is employed.

6. Process as defined in claim 1 wherein the reaction temperature is maintained below about 100° C. during the period of addition of $PCl_5$.

7. Process as defined in claim 1 wherein the catalyst is lithium chloride.

8. Process as defined in claim 1 wherein the catalyst is lithium bromide.

9. Process as defined in claim 1 wherein the mixture contains at least about 75% of a lithium halide.

10. Process as defined in claim 1 wherein the catalyst is employed in amounts ranging from about 5 to about 25 grams per mole of organophosphonyl ester.

11. Process as defined in claim 1 wherein upon completion of the addition of $PCl_5$, the reaction is brought to and maintained at reflux conditions until completion of the reaction.

12. Process as defined in claim 1 wherein upon completion of the reaction, the by-products formed in the reaction are removed and the organophosphonyl dichloride is recovered by distillation.

13. Process as defined in claim 12 wherein upon recovery of the organophosphonyl dichloride, the reaction residue is employed as the catalyst for the further reaction of an organophosphonyl ester and $PCl_5$.

14. Process for the preparation of an oragnophosphonic acid which comprises reacting an organophosphonyl ester having the structural formula:

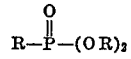

wherein each R can independently be an alkyl or aryl radical, and $PCl_5$ in the presence of a catalyst consisting essentially of a member selected from the group consisting of LiX and mixtures consisting of LiX as major component and an alkalimetal halide or alkaline earth metal halide wherein X is chlorine or bromine, recovering the corresponding organophosphonyl dichloride, and treating the recovered organophosphonyl dichloride with water to form the corresponding acid.

References Cited
UNITED STATES PATENTS

| | | | |
|---|---|---|---|
| 3,098,865 | 7/1963 | Denk et al. | 260—543 PX |
| 3,143,569 | 8/1964 | Abrano et al. | 260—543 P |

LORRAINE A. WEINBERGER, Primary Examiner

R. D. KELLY, Assistant Examiner

U.S. Cl. X.R.

260—543 D